(12) United States Patent
Novak et al.

(10) Patent No.: US 8,405,387 B2
(45) Date of Patent: Mar. 26, 2013

(54) MAGNETIC ENCODER SCALE AND REFERENCE MARK APPLICATOR AND TEMPLATE

(75) Inventors: Janez Novak, Ljubljana (SI); Branko Cvetkovic, Crikvenica (HR)

(73) Assignees: RLS Merilna Tehnika D.O.O., Ljubljana Dobrunje (SI); Renishaw PLC, Wotton-under-Edge (GB)

( * ) Notice: Subject to any disclaimer, the term of this patent is extended or adjusted under 35 U.S.C. 154(b) by 307 days.

(21) Appl. No.: 12/734,028
(22) PCT Filed: Oct. 24, 2008
(86) PCT No.: PCT/GB2008/003627
§ 371 (c)(1), (2), (4) Date: Apr. 6, 2010
(87) PCT Pub. No.: WO2009/053719
PCT Pub. Date: Apr. 30, 2009

(65) Prior Publication Data
US 2010/0207617 A1    Aug. 19, 2010

(30) Foreign Application Priority Data
Oct. 25, 2007   (GB) .................................... 0720972.9

(51) Int. Cl.
G01B 7/30     (2006.01)
G01B 7/04     (2006.01)
(52) U.S. Cl. .................. 324/207.25; 324/207.11
(58) Field of Classification Search ............ None
See application file for complete search history.

(56) References Cited

U.S. PATENT DOCUMENTS

| | | | | |
|---|---|---|---|---|
| 4,242,789 A * | 1/1981 | Fox | ................................ | 29/446 |
| 5,929,789 A | 7/1999 | Barbehenn | | |
| 2002/0190710 A1 | 12/2002 | Steinich et al. | | |

FOREIGN PATENT DOCUMENTS

| | | |
|---|---|---|
| DE | 198 13 375 A1 | 9/1999 |
| DE | 103 38 120 A1 | 3/2005 |
| EP | 1 750 100 A1 | 2/2007 |
| GB | 2035217 A  * | 6/1980 |
| JP | A-57-006316 | 1/1982 |
| JP | A-2003-270257 | 9/2003 |
| JP | A-2005-062189 | 3/2005 |

OTHER PUBLICATIONS

International Search Report issued in Application PCT/GB2008/003627; mailed on Jun. 10, 2009.
Written Opinion of the International Searching Authority issued in Application No. PCT/GB2008/003627; mailed on Jun. 10, 2009.
English-language Translation of Chinese Office Action issued in Application No. 200880113001; Dated Mar. 10, 2011.

* cited by examiner

*Primary Examiner* — Vinh Nguyen
(74) *Attorney, Agent, or Firm* — Oliff & Berridge, PLC

(57) ABSTRACT

A magnetic encoder scale having a series of periodically spaced magnetic marks. A reference mark is applied to the scale using an applicator or template, which has a feature for locating the reference mark. The applicator or template has one or more magnetic marks corresponding to the periodic scale marks, whereby the applicator or template automatically assumes a defined phase relationship relative to the periodic scale marks when placed on the scale. The reference mark may be attached to the scale self-adhesively, or it may be formed by removal of material from the scale, guided by the applicator or template. The applicator may alternatively have a strong permanent magnet which applies further magnetization to a region of the scale.

14 Claims, 6 Drawing Sheets

Figure 4:
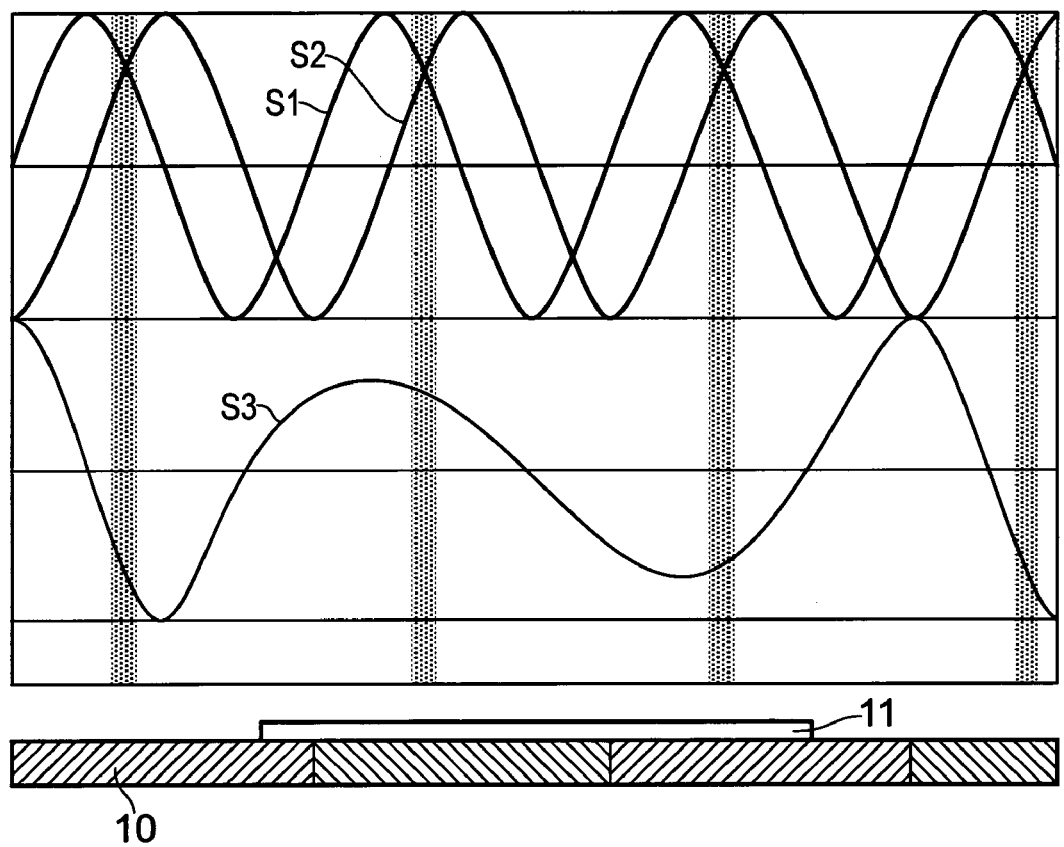

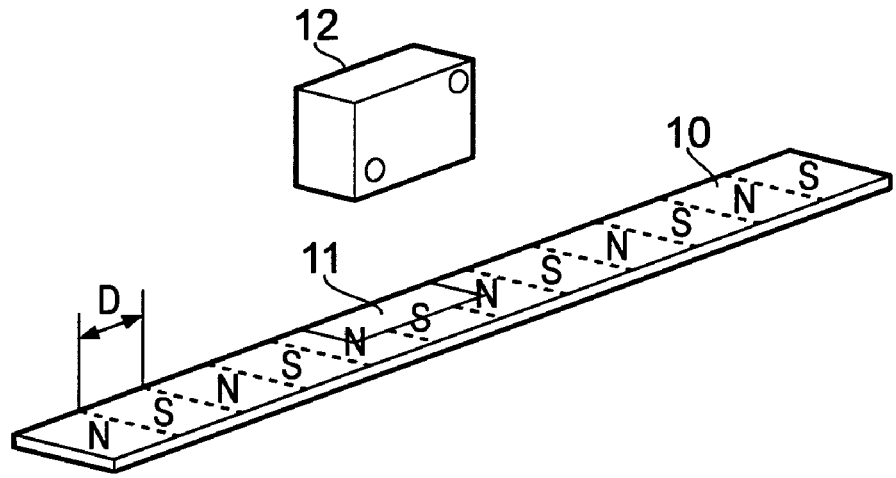
FIG. 1
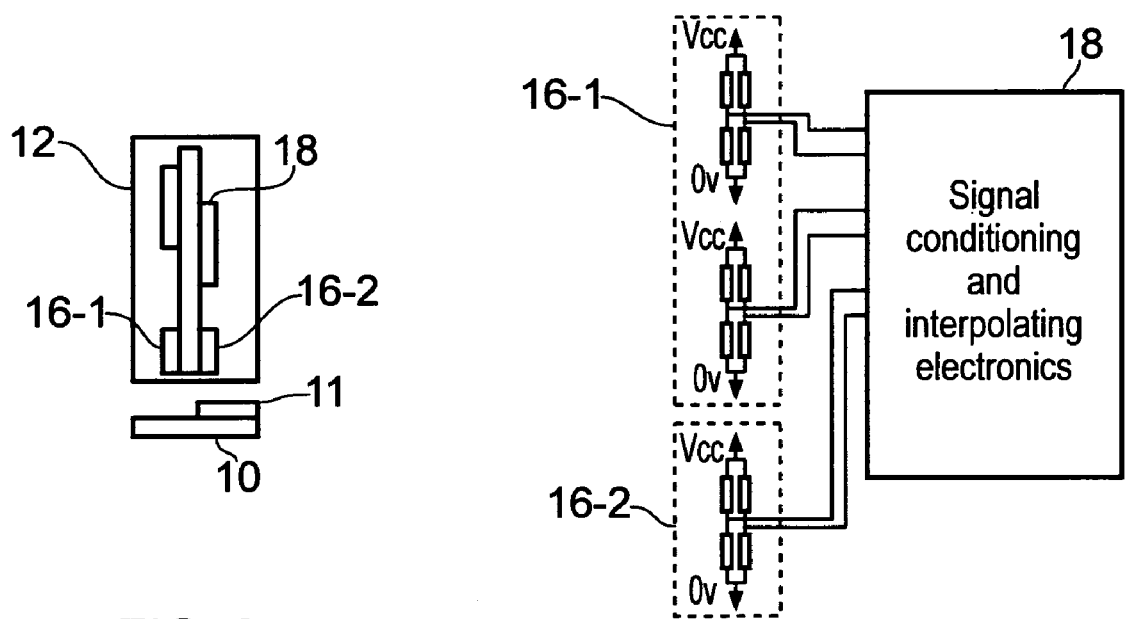
FIG. 2
FIG. 3

MAGNETIC ENCODER SCALE AND REFERENCE MARK APPLICATOR AND TEMPLATE

This invention relates to magnetic encoders. Such an encoder may be used to generate position information when mounted on a drive shaft of a rotationally driven element such as a servomotor or the like, or on a linearly driven element such as a linear actuator or the like.

Encoders serve as devices for detecting the relative rotational or linear positions of two relatively movable parts of a machine. This allows accurate positioning of such machines, and determination of such quantities as velocity and acceleration. Many different kinds of encoders are available for such purposes.

Incremental-type magnetic encoders comprise a rotary or linear scale having a series of spaced magnetic marks, mounted on one of the machine components. A readhead is mounted to the other machine component so as pass along the scale, reading the marks and generating a cyclic or pulsed signal. A counter counts the cycles or pulses to give a position output. This may for example be used as position feedback for positioning a servo-mechanism controlling the movement.

However, incremental-type encoders require initializing whenever power is removed from the device. Initializing the encoder requires sensing a "home" or reference position, which is then used as a reference (or origin, or zero) for subsequent position measurement. If the initializing process includes an error, then all subsequent measurements will include the error. It is therefore known to provide the scale with a reference marker for this purpose.

It is desirable for the user to be able to select the position of the reference marker along the scale when the scale is installed on a machine. Some known encoders therefore provide a plurality of reference markers, and permit the user to select which one is to be used, e.g. with an external switch. However, the provision of this switch (and associated electronics) is expensive and inconvenient.

Another approach is to provide a separate reference marker which the user can place where desired, next to the scale. However, this requires additional space, which may not be available.

A first aspect of the present invention provides a magnetic encoder scale having a series of spaced periodic magnetic marks, together with an applicator or template for positioning a reference mark along the scale, the applicator or template having:

one or more magnetic marks corresponding to the periodic scale marks, whereby the applicator or template automatically assumes a defined phase relationship relative to the periodic scale marks when placed on the scale; and
a feature for locating or forming the reference mark.

A second aspect of the invention provides an applicator or template for use with a magnetic encoder scale as defined in the first aspect above.

A third aspect of the invention provides a method of applying a reference marker to a magnetic encoder scale, using such an applicator or template.

Figure 5:
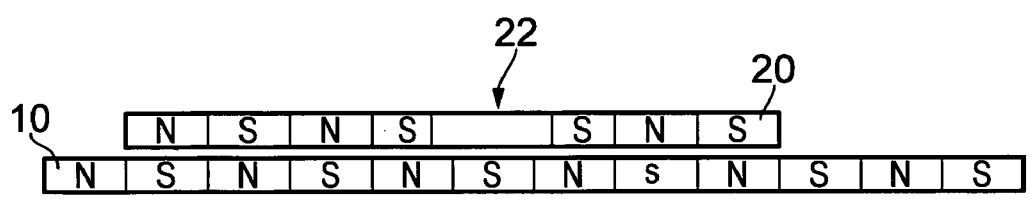
Figure 9:
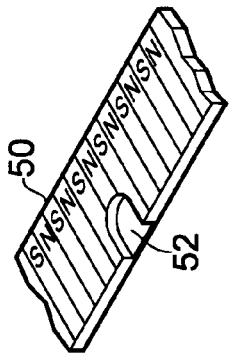
Figure 10:
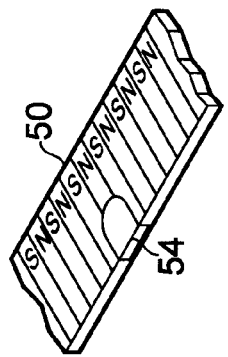
Figure 7A:
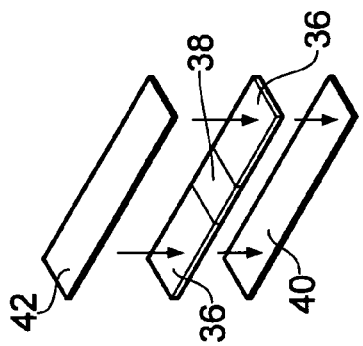
Figure 7B:
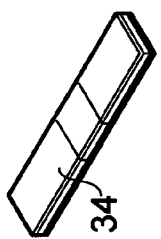
Figure 8A:
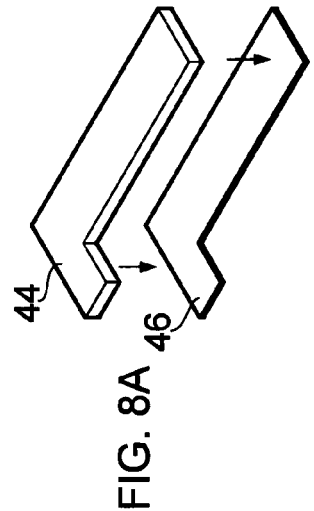
Figure 8B:
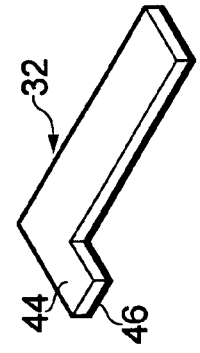
Figure 6A:
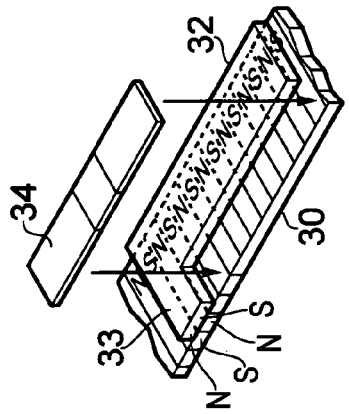
Figure 6B:
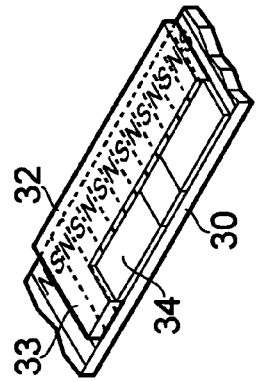
Figure 6C:
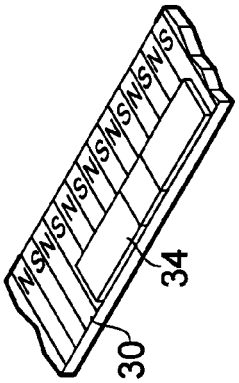
Figure 11:
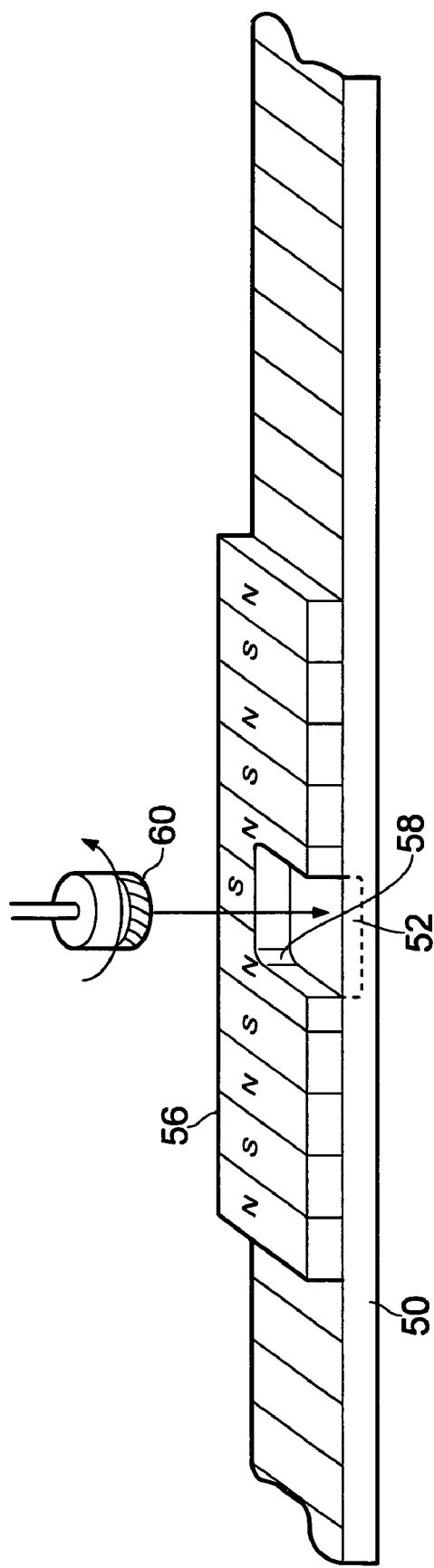

Preferred embodiments of the invention will now be described by way of example, with reference to the accompanying drawings, wherein:

FIG. 1 shows an encoder comprising a scale and a reading head;
FIG. 2 is an end view of the scale and reading head of FIG. 1;
FIG. 3 is a simplified schematic diagram of electronic circuitry for the reading head;
FIG. 4 shows signals generated by the reading head;
FIG. 5 illustrates a first embodiment of applicator template;
FIGS. 6A-6C illustrate a second embodiment of applicator template and its method of use;
FIGS. 7A-7B show the construction of a reference marker used in the second embodiment;
FIGS. 8A-8B show the construction of applicator template used in the second embodiment; and
FIGS. 9, 10 and 11 illustrate a third embodiment of a method according to the invention and an applicator template used in the method;
FIGS. 12-15 illustrate a further embodiment.

FIG. 1 shows a magnetic incremental encoder, comprising an elongate scale assembly 10 and reading head assembly 12. As generally known in the art, the scale assembly 10 includes a periodic magnetised pattern such as a series of relatively finely spaced alternating magnet poles extending perpendicular to the longitudinal edge of the scale assembly. The length of each magnet pole in the longitudinal direction is marked D in FIG. 1, and may for example be 2 mm. The scale 10 is suitably in the form of a magnetic tape. The tape may have a steel substrate (not shown), overlaid with a rubberised magnetic layer having magnetic pattern of alternating magnetic poles. The substrate may have an adhesive layer on its underside for attachment to a machine part. The adhesive layer may be protected by a backing layer which is peeled off when used. Such magnetic tapes are available commercially.

The scale assembly 10 is mounted or secured to one of the relatively movable parts of a machine, and the reading head assembly 12 to another, so that they are relatively movable lengthways with respect to each other. The reading head has circuitry which responds to the periodic magnetic pattern to provide an indication of the relative motion. Also shown in FIG. 1 is a reference marker 11, made of a magnetic material such as soft iron. This is attached over a part only of the width of the scale, as described below.

FIG. 2 shows a simplified end view of the reading head assembly 12 above the scale. In the illustrated embodiment, the reading head includes two separate sets of magnetic detectors 16-1 and 16-2 and electronic circuitry 18 for signal conditioning and interpolation. One set of magnetic detectors 16 (e.g. 16-1) operates in conjunction with the scale pattern on the scale assembly 10 to detect incremental relative motion with relatively high precision. The other set (e.g. 16-2) detects the marker 11 that is used to establish a reference or index for absolute position indication. Magnetic detectors can be realised in different technologies such as magnetoresistive gradiometers or Hall sensors. Below is described an example using magnetoresistive gradiometers.

FIG. 3 shows a simplified electronic circuitry of the reading head. The magnetoresistive sensors 16-1 and 16-2 sense the gradient of the magnetic field over the scale assembly 10. The signal conditioning and interpolating electronics 18 amplifies quadrature sinusoidal input signals from the magnetoresistive sensors 16-1, and by a known interpolating process increases the measuring resolution. FIG. 4 shows a signal diagram of the generated sinusoidal signals and reference signal. Detectors 16-1 generate incremental signals of sinusoidal shape S1, S2, which are mutually shifted by ¼ of their period. These are used for subsequent interpolation and measuring by counting.

Detector 16-2 also generates an incremental signal of sinusoidal shape S3. The signal S3 is disturbed in phase and also in amplitude when it travels over the marker 11. The circuitry 18 generates a reference pulse by detecting this disturbance. As discussed below, the disturbance has a fixed phase relationship to the signals S1, S2. The circuitry 18 furthermore gates the reference pulse with digital quadrature outputs derived from the sinusoidal signals, so that it is enabled only at a strictly defined phase position (which in some cases may be programmable) within one period of the sinusoidal signals which are generated by the sensors.

Since the reference marker 11 extends only part-way across the width of the scale, it is possible for the electronic circuitry 18 to compare the signal S3 with one of the signals S1, S2 in order to determine the position at which there is a maximum phase disturbance. This is used to define the position of the reference pulse.

FIG. 5 illustrates a simple applicator template device for positioning the marker 11 on the scale assembly, in a fixed phase relationship. This applicator device comprises a magnetic strip 20 magnetised in the same way as the scale assembly 10, with same magnet pole length D. A groove or other recess 22 is machined in the strip 20.

The procedure for installation of the marker 11 is as follows:

The user puts the magnetic strip 20 on the scale assembly 10, so that the groove 22 is positioned at the desired position for the reference mark.

The user puts the reference marker 11 into the groove 22 of the magnetic strip.

The user removes the magnetic strip 20, leaving the marker 11 behind. The marker is fixed onto the surface of scale assembly by glue or by double-sided adhesive tape.

Because of the opposing magnetic poles of the strip 20 and the scale 10, the strip automatically assumes a positively-defined phase position relative to the scale. This ensures that the groove 22 and thus the marker 11 have the desired predetermined phase position relative to the periodic magnetic scale pattern. The resulting disturbance in the signal S3 and the reference pulse output therefore have the desired fixed phase relationship to the signals S1, S2. The reference pulse is bidirectional (i.e. it has the same phase position for both forwards and backwards movements of the readhead over the scale).

FIGS. 6, 7 and 8 illustrate a second embodiment of a scale and reference marker. The scale 30 is in the form of a magnetic tape having a periodic pattern of alternating magnetic poles. It may have the same commercially available construction as in FIG. 1. An applicator template 32 has a similar periodic magnetic pattern, with the same pitch. The applicator template 32 has an L-shape, and may be cut from the same tape as the scale 30. A foot portion 33 of the applicator template extends across the width of the scale 30, while the remainder of the template has about half the width of the scale.

FIG. 6A shows that, in use, the applicator template 32 is laid over the scale 30, and automatically assumes a positively-defined phase position relative to the scale, in the same way as in FIG. 5. Next, as shown in FIGS. 6A and 6B, a self-adhesive magnetic reference marker 34 is laid in position and attached to the tape 30, using the applicator template 32 as a guide. In particular, the marker 34 is butted up to the foot portion 33, in order to define its phase relationship to the scale pattern. Finally, as shown in FIG. 6C, the applicator template is removed, leaving the marker behind.

FIG. 7A shows the construction of the reference marker label 34. It comprises two non-magnetic (e.g. plastic) plates 36, between which is located a magnetic plate 38, e.g. of soft iron. These are supported on a double-sided adhesive tape 40, and a label 42 is stuck over the top of the resulting assembly. FIG. 7B shows the finished marker 34. Of course, other constructions are possible. For example, for ease of assembly, there may be just one plastic plate 36 extending the full length of the marker 34, and this may have a central hole into which a smaller soft iron plate 38 is a push fit.

FIGS. 8A and 8B show a possible construction of the L-shaped magnetic applicator template 32. It comprises an L-shaped body 44 of patterned magnetic material (e.g. rubberised). This is supported on top of a plastic tape 46, e.g. of Teflon (polytetrafluoroethylene, PTFE).

In the embodiments described so far, the marker 11, 34 is attached to the surface of the scale. This may give rise to a problem if it is required that the reading head have a low ride height above the scale, e.g. to allow low sub-divisional error and/or if the scale has a high resolution, since there must be a clearance above the thickness of the marker. FIGS. 9, 10 and 11 therefore describe an alternative.

As shown in FIG. 9, the reference marker is not formed from a separate iron plate. Instead it is formed by removal of material from across part of the width of the scale 50, leaving a recess 52. If the scale is made from the previously-mentioned tape, in which a rubberised magnetic material is provided on a steel substrate tape, then the recess is cut only into the rubberised material, leaving the steel tape intact in the recess 52. The recess 52 is then filled with a suitable non-magnetic material 54 such as resin, as shown in FIG. 10.

As shown in FIG. 11, the recess is cut using a template 56. This has a magnetic pattern which locates it on the scale 50 with a positive phase relationship, as in previous embodiments. The template has a cut-out 58, which is used to guide a milling cutter 60 to cut the recess 52.

The use of a milling cutter 60 is suitable if the reference marker is to be formed by the scale manufacturer. If the reference marker is to be positioned by the user when the scale is installed on a machine, however, it may be easier to form the recess 52 using a hole punch. This removes the rubberised magnetic material in the recess, but leaves the steel substrate. Again, the template 56 is used as a guide to ensure the phase relationship of the marker relative to the periodic scale pattern.

FIGS. 12-15 illustrate a further embodiment, again using the scale 10 as in FIG. 1.

Figure 12:
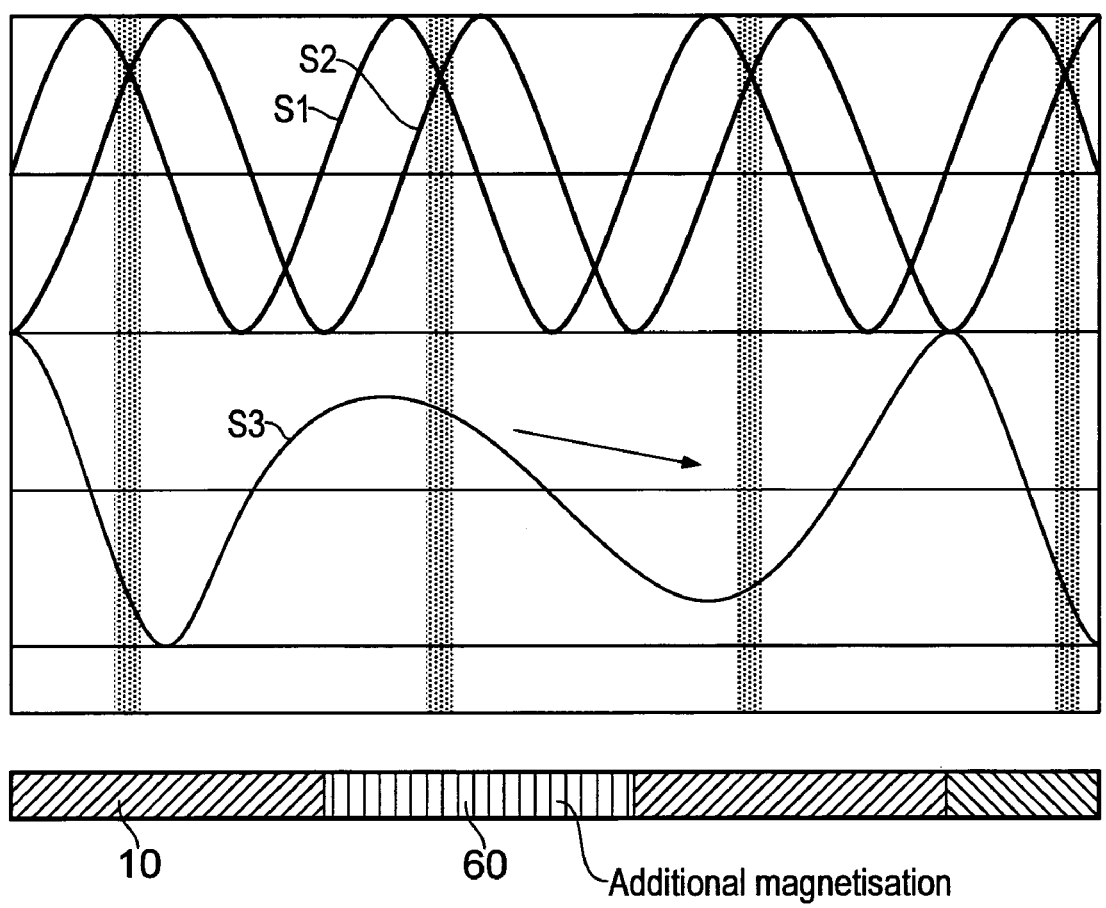

Rather than providing a reference mark 11 stuck onto the scale, or cut out of it, the reference mark in this embodiment is provided as shown in FIG. 12, by further magnetising the scale in the region 60 of one of the existing magnetic pole pitches. As previously, this produces a signal S3 with a disturbed phase, in order to define the position of the reference mark. The additional magnetisation extends across only part of the width of the scale, covering less than half of the width, so that the incremental signals S1, S2 may be read undisturbed, also as previously.

Figure 13:
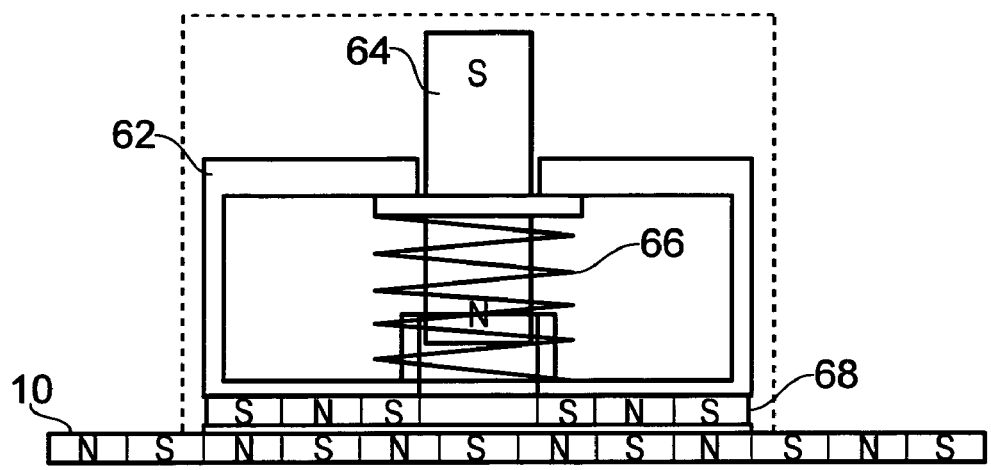
Figure 14:
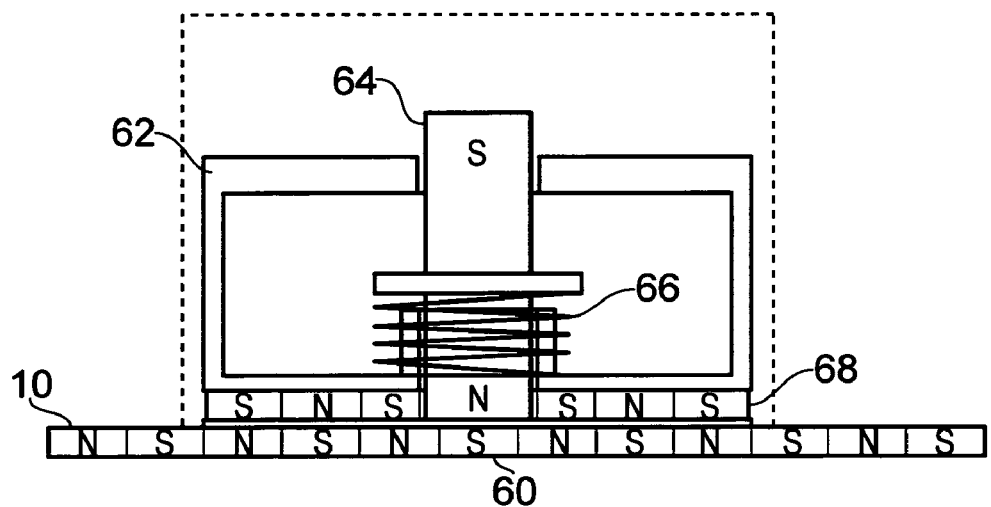
Figure 15:
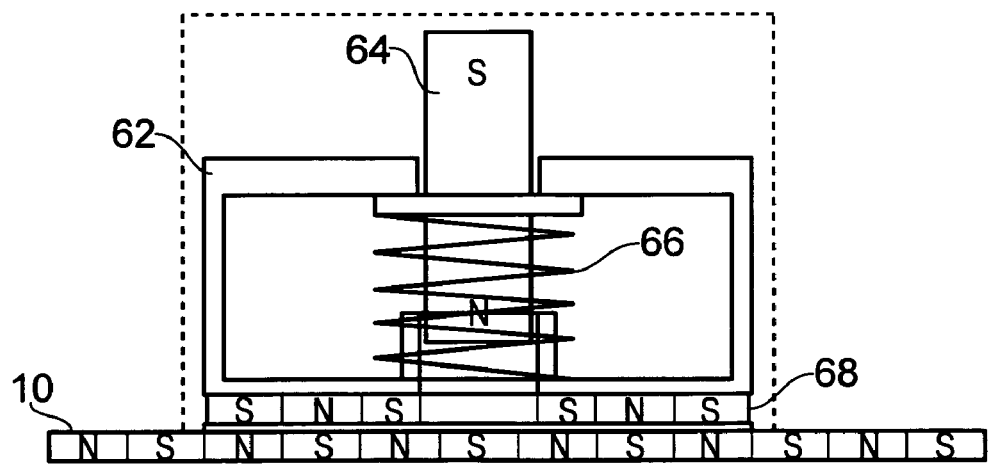

The further magnetisation is produced by pressing a strong magnet (preferably a permanent magnet) into a magnetising relationship with the scale in the region 60, e.g. so that it touches the scale. FIGS. 13-15 show an applicator for doing this.

The applicator comprises a housing 62 in which the magnet 64 is mounted. The magnet is biased within the housing by a spring 66. On the underside of the housing, there is provided a short series of magnet poles at the same pitch as the scale 10. As previously, this is conveniently a strip 68 of the same material as the scale.

As shown in FIG. 13, the applicator is placed against the scale 10, and assumes a predetermined phase relationship with it by self-alignment of the opposing magnetic poles of the strip 68 with those of the scale.

Next, as shown in FIG. 14, the user pushes the magnet 64 down, against the bias of the spring 66. This causes the magnet to touch the scale in the region 60, forming the further magnetisation. As shown, the magnet is oriented with opposite polarity to the existing magnetisation of the region 60, so that the further magnetisation reinforces the existing magnetisation. Alternatively, however, it could have the same polarity, and reduce or reverse the existing magnetisation.

Finally, as shown in FIG. 15, the user releases the magnet 64, and it retracts under the action of the spring 66. The applicator is then removed from the scale.

While linear scales have been described, the invention is equally applicable to rotary scales.

The invention claimed is:

1. A magnetic encoder scale having a series of spaced periodic magnetic marks, together with an applicator or template for positioning a reference mark along the scale, the applicator or template comprising:
   a series of magnetic marks having substantially the same pitch as the series of periodic magnetic scale marks, whereby the applicator or template automatically assumes a defined phase relationship relative to the periodic magnetic scale marks when placed on the scale by self-alignment of the opposing magnetic poles of the magnetic marks with those of the periodic magnetic scale marks; and
   a feature for locating or forming the reference mark.

2. A magnetic encoder scale according to claim 1, wherein said feature comprises a recess in the applicator or template.

3. A magnetic encoder scale according to claim 1, wherein the applicator or template is L-shaped.

4. A magnetic encoder scale according to claim 1, with a reference marker which defines the reference mark, the marker being attached to a surface of the scale.

5. A magnetic encoder scale according to claim 1, wherein the reference mark is formed by removal of material from the scale.

6. A magnetic encoder scale according to claim 1, wherein the applicator comprises a magnet which is movable into a magnetising relationship with the scale, so as to provide further magnetisation in a region thereof thereby forming the reference mark.

7. A magnetic encoder scale according to claim 1, wherein the reference mark extends across only a part of the width of the scale.

8. An applicator or template for use with a magnetic encoder scale having a series of spaced periodic magnetic scale marks, for positioning a reference mark along the scale, the applicator or template having:
   a series of magnetic marks having substantially the same pitch as the series of periodic magnetic scale marks, whereby the applicator or template automatically assumes a defined phase relationship relative to the periodic magnetic scale marks when placed on the scale by self-alignment of the opposing magnetic poles of the magnetic marks with those of the periodic magnetic scale marks; and
   a feature for locating or forming the reference mark.

9. An applicator or template according to claim 8, wherein said feature comprises a recess in the applicator or template.

10. An applicator or template according to claim 8, wherein the applicator or template is L-shaped.

11. An applicator or template according to claim 8, with a reference marker which defines the reference mark, the marker being attachable to a surface of the scale.

12. An applicator or template according to claim 8, for guiding the formation of the reference mark by removal of material from the scale.

13. An applicator or template according to claim 8, wherein the applicator comprises a magnet which is movable into a magnetising relationship with the scale, so as to provide further magnetisation in a region thereof thereby forming the reference mark.

14. A method of applying a reference mark to a magnetic encoder scale having a series of spaced periodic magnetic scale marks, comprising
   providing an applicator or template having a series of magnetic marks having substantially the same pitch as the periodic magnetic scale marks;
   placing the applicator or template on the scale and allowing the applicator or template to automatically assume a defined phase relationship relative to the periodic magnetic scale marks by self-alignment of the opposing magnetic poles of the magnetic marks with those of the periodic magnetic scale marks; and
   using a feature of the applicator or template to locate or form the reference mark.

* * * * *